United States Patent Office 3,090,814
Patented May 21, 1963

3,090,814
PROCESS OF MAKING VINYL ARYL ETHERS
Donald J. Foster, South Charleston, and Erich Tobler, Charleston, W. Va., assignors to Union Carbide Corporation, a corporation of New York
No Drawing. Filed Apr. 12, 1960, Ser. No. 21,593
6 Claims. (Cl. 260—612)

This invention relates to a new method of making vinyl aryl ethers.

Vinyl aryl ethers are monomers of considerable interest but heretofore there have been no fully satisfactory methods for their synthesis. Vinyl phenyl ether was prepared by heating 2-bromoethyl phenyl ether with an excess of powdered potassium hydroxide by Hurd et al., J. Am. Chem. Soc., 60, 1905 (1938). The vinyl ethers of phenols, cresols and chlorophenols have been prepared using vinyl chloride as a vinylating agent, as taught by Ernest et al. in German Patent No. 513,679. Attempts to prepare vinyl aryl ethers from phenols, acetylene and catalysts such as heavy metal salts ordinarily do not result in the formation of vinyl ether monomers since condensations and rearrangements often occur.

We have now discovered that vinyl aryl ethers may be readily and conveniently prepared in good yields by the reaction of aryl hydroxyl compounds with divinyl mercury. Temperature is not critical in the reaction and in most cases the reactants will combine slowly at room temperature. Elevated temperatures are preferred to accelerate the reaction, with the top limitation of temperature being that imposed by polymerization and decomposition. Temperatures of 50° C. to 100° C. are preferred. Atmospheric pressure is satisfactory though other pressures would be used if desired. Stoichiometric quantities of the reactants are normally employed, although these proportions may be varied if desired. A solvent is not required for the reaction but may be employed if desired.

It is believed that an unstable intermediate compound, a vinylmercuric ether, is formed during the reaction but is immediately converted to a vinyl aryl ether.

The reaction may be represented by the equation

ROH + (CH$_2$=CH)$_2$Hg →
[R—O—Hg—CH=CH$_2$] →
R—O—CH=CH$_2$ + Hg wherein ROH is any aryl hydroxy compound which does not contain a second active hydrogen. Thus suitable aryl hydroxy compounds include phenol and naphthol and substituted phenols and naphthols which may contain one or more substituents which do not have active hydrogen compounds such as the halogens, chlorine, bromine and iodine, the lower alkyls, methyl, ethyl, propyl and butyl and the like.

Divinyl mercury can be made by adding mercuric chloride to vinylsodium in a solvent such as butyl ether.

Example I

A mixture of 25.5 grams (0.1 mol) of divinyl-mercury and 9.4 grams of phenol was heated on a steam bath for three hours. Gas was evolved during this period and it was collected and subsequently analyzed in a mass spectrometer. The gas consisted entirely of ethylene. The liquid reaction product was decanted from the deposited mercury and distilled under reduced pressure. Phenyl vinyl ether boiling at 57–59° C. at 19 millimeters of mercury pressure was obtained in 73 percent yield. It was shown to be identical with an authentic sample of phenyl vinyl ether prepared by an alternate method. The recovery of metallic mercury was 96 percent of the theoretical.

Example II

Ethylene gas was evolved when 25.5 grams (0.1 mol) of divinylmercury and 10.8 grams (0.1 mol) of p-cresol were heated on a steam bath for several hours. During this period metallic mercury was deposited, 18.8 grams, 94 percent of the theoretical. The liquid reaction product was distilled under reduced pressure to give a colorless liquid boiling at a temperature of 58–60° C. at a reduced pressure of 5 millimeters of mercury. This material was compared spectroscopically with an authentic sample of vinyl-p-cresyl ether and found to be identical.

Analysis.—Calc'd for C$_9$H$_{10}$O$_1$: C, 80.56; H, 7.51. Found: C, 80.20; H, 7.2.

Example III

Warming a mixture containing 25.5 grams (0.1 mol) of divinylmercury and 16.3 grams (0.1 mol) of 2,4-dichlorophenol resulted in the evolution of ethylene and the deposition of metallic mercury. The recovery of mercury was in excess of 95 percent of the theoretical. The liquid reaction product was distilled under reduced pressure to give a 75.4 percent yield of pure vinyl-2,4-dichlorophenol ether boiling at a temperature of 86–88° C. at 5 millimeters of mercury pressure. The product was identified by an elemental analysis and a spectroscopic comparison with an authentic sample of vinyl-2,4-dichlorophenyl ether.

Example IV

The gas evolved on warming 25.5 grams (0.1 mol) of divinylmercury and 19.8 grams (0.1 mol) of 2,4,6-trichlorophenol on a steam bath was composed entirely of ethylene. Concurrent with the evolution of ethylene 19 grams of metallic mercury was deposited. The organic liquid was distilled at a temperature of 75–77° C. under reduced pressure of 1.2 millimeters of mercury to yield pure vinyl-2,4,6-trichlorophenyl ether in the amount of 17.7 grams or 79.2 percent of the theoretical. The product proved to be identical with an authentic sample of vinyl 2,4,6-trichlorophenyl ether.

What is claimed is:
1. Process for making vinyl aryl ethers which comprises reacting divinylmercury with an arylhydroxy compound wherein the substituents on the aryl radical, other than hydrogen and hydroxy, are selected from the group consisting of halogen and lower n-alkyl.
2. Process for making vinyl aryl ethers which comprises reacting divinylmercury with an arylhydroxy compound wherein the substituents on the aryl radical, other than hydrogen and hydroxy, are selected from the group consisting of halogen and lower n-alkyl, at a temperature between about 50° C. and 100° C.
3. Process according to claim 1 wherein said arylhydroxy compound is phenol.
4. Process according to claim 1 wherein said arylhydroxy compound is cresol.
5. Process according to claim 1 wherein said arylhydroxy compound is a chlorophenol.
6. Process according to claim 1 wherein said arylhydroxy compound is naphthol.

References Cited in the file of this patent

Cohen: Jour. Org. Chem., vol. 22 (1957), pp. 1333–1335, 260–612(D).

Bartocha et al.: Chemical Society Proceedings (1958), p. 116.

Foster et al.: Amer. Chem. Soc., Abstracts of Papers, 138th Meeting, September 1960, p. 53p.
(Copies in Library.)